(12) United States Patent
Karim et al.

(10) Patent No.: US 8,192,762 B2
(45) Date of Patent: Jun. 5, 2012

(54) PREPARATION OF SOLUBLE AND COLLOIDAL MOLECULARLY IMPRINTED POLYMERS BY LIVING POLYMERIZATION

(75) Inventors: Khalku Karim, Cambridge (GB); Sergey Anatoliyovich Piletsky, Cranfield (GB); Olena Volodimirivna Piletska, Cranfield (GB); Anthony Peter Francis Turner, Wilstead (GB); Iva Chianella, Silsoe (GB); Antonio Ricardo Leonardo Guerriero, Cranfield (GB)

(73) Assignee: Cranfield University, Bedfordshire (GB)

( * ) Notice: Subject to any disclaimer, the term of this patent is extended or adjusted under 35 U.S.C. 154(b) by 966 days.

(21) Appl. No.: 11/916,178

(22) PCT Filed: Jun. 1, 2006

(86) PCT No.: PCT/GB2006/001986
§ 371 (c)(1),
(2), (4) Date: Aug. 13, 2008

(87) PCT Pub. No.: WO2006/129088
PCT Pub. Date: Dec. 7, 2006

(65) Prior Publication Data
US 2008/0311072 A1 Dec. 18, 2008

(30) Foreign Application Priority Data
Jun. 1, 2005 (GB) .................................. 0511116.6

(51) Int. Cl.
*A61K 31/785* (2006.01)
(52) U.S. Cl. .................. 424/489; 424/400; 436/501
(58) Field of Classification Search .................. 424/489, 424/400; 436/501
See application file for complete search history.

(56) References Cited

U.S. PATENT DOCUMENTS

| | | | |
|---|---|---|---|
| 5,630,978 A | 5/1997 | Domb | |
| 5,858,296 A | 1/1999 | Domb | |
| 5,994,110 A | 11/1999 | Mosbach et al. | |
| 6,127,154 A | 10/2000 | Mosbach et al. | |
| 6,759,488 B1 | 7/2004 | Sellergren et al. | |
| 6,852,818 B1 | 2/2005 | Piletsky et al. | |

FOREIGN PATENT DOCUMENTS

| | | |
|---|---|---|
| EP | 1 647 560 | 4/2006 |
| WO | WO-96/41173 | 12/1996 |
| WO | WO-2005/038734 | 4/2005 |
| WO | WO-2006/004536 | 1/2006 |

OTHER PUBLICATIONS

Boonpangrak, S. et al., "Preparation of molecularly imprinted polymers using nitroxide-mediate living radical polymerization," Biosensors and Bioelectronics 22 (2006) 349-354.*
Chen, X., et al., "A novel thermal iniferter for radical polymerization," European Polymer J., 36 (2000), 1547-1554.*
Grubbs, R. et al., "A Tandem Approach to Graft and Dendritic Graft Copolymers Based on "Living" Free Radical Polymerizations," Angew. Chem. Int. Ed. Engl., 1997, 36 No. 3, 270-272, (Published Online Dec. 22, 2003).*
Oral et al, "Dynamic studies of molecular imprinting polymerizations", Aug. 19, 2004, pp. 6163-6173, vol. 45, No. 18, Polymer, Elsevier Science Publishers B.V., Great Britain.
Spijker et al, "Unusual rate enhancement in the thymine assisted ATRP process of adenine monomers", Sep. 8, 2005, pp. 8528-8535, vol. 46, No. 19, Polymer, Elsevier Science Publishers B.V., Great Britain.

* cited by examiner

*Primary Examiner* — Michael G Hartley
*Assistant Examiner* — Robert Cabral
(74) *Attorney, Agent, or Firm* — B. Aaron Schulman, Esq.; Terry L. Wright, Esq.; Stites & Harbison PLLC

(57) ABSTRACT

The present invention describes a method for synthesis of relatively low molecular weight imprinted polymers using living polymerization, and their application in analytical chemistry, pharmacology, medicine and the food industry. Specifically the low-molecular weight polymers are synthesized by the polymerization of functional monomers in the presence of a template, such as a biological receptor, enzyme, nucleic acid, cell, virus, microorganism, tissue sample or drug using living initiator. The conditions of living polymerization ensure a relatively small size of synthesized molecules. Synthesized in this way molecules (dimers, oligomers, polymers, or their mixture) have a higher affinity to the template than the original monomers and can rebind it in vitro and/or in vivo. As a further aspect of the present invention, polymers synthesized as described above can be used as drugs in pharmacology and medicine, as receptor-specific ligands in analytical chemistry (sensors, assays), and for separations in the biotechnology, pharmaceutical and food industries.

21 Claims, 2 Drawing Sheets

(Dormant)                                          (Active)

PREPARATION OF SOLUBLE AND COLLOIDAL MOLECULARLY IMPRINTED POLYMERS BY LIVING POLYMERIZATION

TECHNICAL FIELD

The present invention relates to the field of organic synthesis and polymer chemistry, and particularly to the area concerned with the methodology for the preparation of organic molecules by template-directed synthesis and template polymerization.

BACKGROUND ART

The term "template-directed synthesis" includes the formation of a new substance by chemical modification of a substrate, or by the coupling of two or more molecules in the presence of a template which serves as a pattern for new structure formation. The most well-known example of this process is gene transcription. A particular example of template-directed synthesis is template polymerization, where formation of polymeric receptor (replica) proceeds in the presence of another polymer or small molecular weight organic substance-template. Prior to the initiation of polymerization, and during polymerization, the monomers spatially distribute themselves (self-assembling process) around the template molecules in accordance with the size, polarity and functionality of the template. The monomers are polymerized into either linear chains or rigid three-dimensional networks.

The specific example of template polymerization is molecular imprinting, based on polymerization of vinyl or acrylic monomers in the presence of template (see ref. 1, 2). The traditional approach involves the production of highly cross-linked imprinted polymers, which are insoluble in water and organic solvents. Because of their inherent insolubility, the possibility to use molecularly imprinted polymers (MIPs) in pharmacology and medicine is restricted.

Recently, several attempts have been made in order to develop protocols for the preparation of imprinted polymers with relatively low-molecular weights which could exist in soluble or at least colloidal forms. This format will allow polymers to be used as biologically active molecules (drugs, effectors, modulators, inhibitors) in pharmacology and medicine and as truly "plastic antibodies" in sensors and in affinity separation.

In one such example, MIP molecules were synthesized by a polycondensation of amino acids and nucleotides around a biological receptor, enzyme, nucleic acid, cell, virus, micro organism, tissue sample or drug (see U.S. Pat. No. 6,852,818). In another example, different methods were used to produce oligomeric and polymeric MIPs (see U.S. Pat. No. 6,127,154) Most of the examples in the prior art describe preparation of high-molecular weight cross-linked polymers which require hydrolysis for delivering soluble or colloidal particles stable in solution. In one such example (see U.S. Pat. No. 6,127,154) researchers used specially designed compounds containing photoactive perfluorophenylazido groups capable of coupling upon illumination. In this case oligomers could be synthesised as soluble particles. In all of these cases, synthesized compounds have fractions with poorly controlled size and properties. Other approaches for synthesis of MIPs with biological activity are described in WO 96/40822 and U.S. Pat. No. 5,630,978, where biologically-active molecules were prepared in the presence of template-imprinted polymer, which in turn were prepared in the presence of another template, normally a drug such as heparin. The resulting replica resembles the structure of the original drug molecule. It can hardly be expected that the activity of molecules synthesized in this way can be more pronounced than that of original template.

The living free-radical polymerization techniques, such as iniferter polymerization, nitroxide-mediated radical polymerization, atom-transfer radical polymerization (ATRP) and reversible addition-fragmentation chain-transfer (RAFT) polymerization, open new routes for the synthesis of polymers with controlled relatively low-molecular weights (see ref. 3-9). Controlled/living polymerization techniques are based on a delicate balance between dormant and active species that effectively reduces the concentration of free radicals in the system and minimizes the extent of termination. Living polymerization could be free of side reactions such as termination and chain transfer and thus can generate polymers with well defined molecular weight distribution and structure. The same approach can be applied to copolymers, thus making it possible to produce block copolymers by free radical polymerisation by proper sequencing of the monomer additions.

Living polymerization has been used previously in producing bulk grafted MIPs (see ref. 10, 11). The soluble polymers were also produced by living polymerization and used later in MIP production (see ref. 12). However, no one so far has developed soluble MIPs by living polymerization.

Background material can be found in the following references.

1. Wulff, G. *Makromol. Chem. Macromol. Symp.*, 1993, 70/71, 285.
2. Viatakis, G.; et al. *Nature*, 1993, 361, 645.
3. Moad, G.; Rizzardo E.; Solomon, D. H. *Macromolecules* 1982, 15, 909;
4. Matyjaszewski, K.; Xia, *J. Chem. Rev.* 2001, 101, 2921.
5. Kamigaito, M.; Ando, T.; Sawamoto, M. *Chem. Rev.* 2001, 101, 3689.
6. Hawker, C. J.; Bosman, A. W.; Harth, E. *Chem. Rev.* 2001, 101, 3661.
7. Fischer, H. *Chem. Rev.* 2001, 101, 3581.
8. Otsu, T.; Matsumoto, A. *Adv. Polym. Sci.* 1998, 136, 75-137.
9. Moad, G.; et al. *Polym. Int.* 2000, 49, 993-1001.
10. Ruckert, B.; Hall, A. J.; Sellergren B. *J. Mater. Sci.* 2002, 12, 2275.
11. Hattori, K.; et al. *J. Membr. Sci.* 2004, 233, 169.
12. Li, Z.; Day, M.; Ding, J. F.; Faid, K. *Macromolecules.* 2005, 38, 2620.
13. Jagur-Grodzinski, J. *Reactive & Functional Polymers.* 2001, 1, 1.
14. Shim, S. E. et al. *Macromolecules.* 2003, 36, 7994-8000.
15. Yu, Q.; Zeng, F.; Zhu S. *Macromolecules.* 2005, 34, 1612.
16. U.S. Pat. No. 5,994,110
17. WO 96/41173

DISCLOSURE OF INVENTION

The present invention describes the application of living polymerization for producing soluble or colloidal MIP particles.

In one aspect, the invention provides a process for the preparation of a solution or colloidal suspension of a polymer comprising template-directed living polymerisation of functional monomers performed in the presence of a template, preferably a molecular template, thereby producing a complementary polymer at least a part of which is complementary to at least a part of the template, and the process including terminating the living polymerisation when complementary polymer particles suitable for preparation of the solution or colloidal suspension have formed.

In one aspect the process includes a step of modifying the complementary polymer particles to produce derived polymer particles, at least a part of which is complementary to at least a part of the template, for preparation of the solution or colloidal suspension.

The living polymerisation technique is preferably selected from iniferter polymerisation, stable free radical-mediated polymerisation, atom transfer radical polymerisation (ATRP), and reversible addition-fragmentation chain transfer (RAFT) polymerisation, and is preferably a nitroxide-mediated radical polymerisation.

In cases where the living polymerisation technique is an iniferter polymerisation, the iniferter is preferably selected from: photo iniferters bearing a dithiocarbamyl group; and thermal iniferters bearing an azo group.

In one aspect, the process includes the steps of: separating from the polymerisation system a complex comprising the template and complementary polymer; and subsequent removal of the template. Preferably, this separation of the template from the polymer is by means of one or more of: change in pH of the solution; change in the ionic strength of the solution; and adding urea, guanidine, or a substance which interacts with the template stronger than does the polymer. For example, the removal of the template may employ one or more of filtration, electrophoresis, chromatographic separation, washing, centrifugation, and dialysis.

In one aspect, the process further comprises the use of affinity separation to isolate a complementary polymer fraction, preferably a complementary polymer particle fraction, having a specific affinity to the template.

In one aspect, the living polymerisation process preferably includes the steps of:
a) template-directed living polymerisation of a functional monomer in the presence of a template;
b) stopping polymerisation;
c) re-starting polymerisation in the presence of a different functional monomer; thereby producing a complementary polymer which is a block copolymer, at least a part of which is complementary to at least a part of the template; and
d) optionally repeating steps a) to c).

In one aspect, the process may further comprise the step of cross-linking the functional monomers.

In one aspect, the present invention provides a polymer prepared according to the process of the present invention, and its use as a drug, a receptor-specific ligand in analytical chemistry, or for use in performing separations in biotechnology, or the pharmaceutical or food industries, contrasting agent, catalyst, or sensor element, and preferably for use as a drug.

In one aspect, the present invention includes the use of a solution or colloidal suspension prepared according to the process of any one of the preceding claims to attach the polymer to a surface, comprising the steps of: contacting the solution or colloidal suspension of a polymer with a surface; and restarting the living polymerisation to effect reaction between the polymer and the surface. The present invention also includes products having a surface with an attached polymer, the polymer being attached to the surface in this manner, and their use as a drug, as a receptor-specific ligand in analytical chemistry, or for use in performing separations in biotechnology, or the pharmaceutical or food industries.

A method for the synthesis of a wide variety of biologically active molecules (drugs, effectors, modulators, inhibitors) is disclosed. In the method described here, the MIPs are produced in the presence of a template using living polymerization techniques. The polymerization reaction is terminated at early stage when the size of synthesized molecules is relatively small. The product of such a process could exist in soluble or colloidal form stable in solution. This is of course distinctive from a gelled form that would normally arise from allowing the polymerisation to run its full course. The colloidal suspensions or solutions of MIPs according to this invention may be in either aqueous or organic liquids.

The synthesized molecules have a structure complementary to that of the original template and have the ability to bind it with reasonably high affinity. These synthetic molecules (polymers and oligomers) have predetermined affinities and specificities, superior activity to randomly synthesized polymers and can be prepared much more easily than specifically designed discrete organic structures. Molecules synthesized as described in this invention (dimers, oligomers, polymers, or their mixture) can be used as drugs in pharmacology and medicine, as receptor-specific ligands in analytical chemistry (sensors, assays), and for separation in the biotechnology, pharmaceutical and food industries. Previous efforts in drugs design have typically been based upon the cumbersome investigation of structure-activity relationships of large numbers of chemical structures. The present invention describes a simpler and direct method—living imprinting polymerization to design a biologically-active substance, which should be of great benefit (in comparison with traditional drug design and discovery methods) as well as useful ligands for affinity separation, sensors and catalysis.

Important aspects of the invention include: (1). Synthesis of the biologically-active molecules by living polymerization in the presence of a template which can be a biological receptor, nucleic acid, cell, virus, microorganism, tissue sample, carbohydrate, oligosaccharide, polysaccharide, nucleoprotein, mucoprotein, lipoprotein, synthetic protein, glycoprotein, glucosaminoglycan, steroid, immunosuppressant, hormone, heparin, antibiotic, vitamin or drug.

(2). Optimization of the conditions of the reaction in order to generate relatively small size of synthesized particles.

(3). Synthesis of the biologically-active molecules from the functional monomers, which can include one or more of: vinyl monomers, allyl monomers, acetylenes, acrylates, methacrylates, derivatives of amino acids, nucleosides, nucleotides, and carbohydrates.

(4). Separation of synthesized particles by chromatography, filtration and electrophoresis.

(5). Sequential polymerization when imprinted polymer is modified with other types of molecules in order to change properties or functions of synthesized molecules.

(6). The application of the synthesized molecules as drugs in pharmacology and medicine, as receptor-specific ligands in analytical chemistry (sensors, assays), for separation in biotechnology, pharmacology and food industry.

DETAILED DESCRIPTION

The present invention describes the formation of the soluble MIPs, prepared in the presence of a template, small or large molecules such as receptors, enzymes or nucleic acids.

In contrast to the traditional approach to MIP preparation, polymers prepared in this way resemble effectors (activator, inhibitor or substrate) of the template, and can have biological activity. Such polymers can be used, for example, as drugs in pharmacology and medicine.

In one aspect, the present invention relates to the synthesis of biologically-active molecules by living radical polymerization (LRP) or living anionic or cationic polymerizations in the presence of a template which can be a biological receptor, nucleic acid, cell, virus, microorganism, tissue sample, carbohydrate, oligosaccharide, polysaccharide, nucleoprotein, mucoprotein, lipoprotein, synthetic protein, glycoprotein, glucosaminoglycan, steroid, immunosuppressant, hormone, heparin, antibiotic, vitamin, or drug. Normally a template soluble in an appropriate organic solvent or water is mixed together with functional monomers, one of which can be a cross-linker, and a living initiator.

Polymerization can be initiated by heating, or preferably by UV irradiation and normally takes minutes or hours depending on the reactivity of the species. Several different forms of controlled/"living" polymerisations are covered by the present invention. They all are based on reversible transformations by thermal, chemical, or photochemical stimuli of dormant species into reactive free-radicals or ions acting as chain propagators. For this the equilibrium constant of the reactions is shifted in favour of the dormant species and should allow a fast exchange between the dormant species and the free radicals. Thus the concentrations of radicals will be very low and their residence time very short, which reduces the probability of side reactions that lead to the termination of the growing polymer chain.

Figure 1:
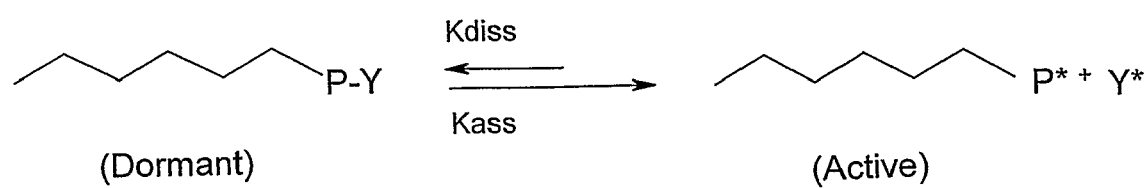
FIG. 1 depicts schematic model of nitroxi-mediated polymerisation and the structure of the nitroxi radical TEMPO-4-one.
Figure 1:
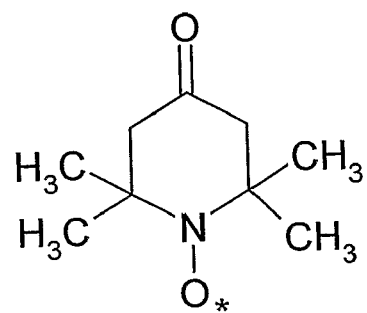

Some examples of living polymerization include, but by all means are not limited to nitroxide-mediated polymerisation (NMP), atom-transfer radical polymerisation (ATRP) and reversible addition-fragmentation chain-transfer polymerisation (RAFT). In NMP for example, a very fast coupling reaction of nitroxide radicals with polymer chain-end radicals is combined with a slow, thermally driven fragmentation of the temporarily capped living polymer to regenerate the nitroxide and the polymer radical P* (see e.g., FIG. 1). The RAFT polymerisation is based on reversible addition-fragmentation chain transfer equilibrium, where there is an exchange between active and dormant species. The generated radicals start to grow and when a molecule, acting as a chain transfer agent, is encountered, they add to it in a reversible way.

Generally the living polymerisation process allows the use of iniferters (initiator transfer-agent terminator) which optionally can be made in conjunction with conventional initiators to confer a living nature to the polymerisation. This iniferters can be photo-iniferters bearing a dithiocarbamyl group and thermal-iniferters carrying carbon-carbon or azo groups (see e.g., ref. 13). The preferred kind of iniferters are those that yield different radicals, one carbon radical which is reactive and another one less reactive or non reactive, which is, e.g., a dithiocarbamyl radical. The carbon radical, which is usually a benzyl radical, can react with the vinyl monomer to initiate the polymerisation. The dithiocarbamyl radical is the one that can terminate the polymerisation by recombining with a growing polymer chain (see e.g., ref. 14).

Other compounds which could be used as initiators for different types of living polymerisation (atom transfer, anionic, cationic etc.), covered by the scope of present invention include but are not limited to: 2-bromopropionitrile with Cu(I)Br complexed with N,N,N',N'',N''-pentamethyldiethylenetriamine, polystyrene bromo macroinitiator with Cu(I)Cl/PMDETA; ethyl 2-bromoisobutyrate with CuCl/bipyridine; 1,4-bis(2,6-diisopropylphenyl)acenaphatenediiminenickel (II) dibromide; 2,2-dimethoxy-2-phenylacephenone in combination with tetraethylthiuram disulfide; tetraphenyl biphosphine; tertiary peroxides such as di-tert-butyl peroxide; $SmMe(C_5Me_5)_2(THF)$; styrene-based epoxides in conjunction with $TiCl_4$; methylstyrene tetramer disodium; $MoOCl_4$-n-BuSn-EtOH; $HCl/ZnCl_2$; methyl p-toluenesulphonate; 2,10,15,20-tetraphenylporphinato aluminium methyl; 3-methyl-1,1-diphenylpentyllithium; butyllithium in THF; molybdenum alkylidine compounds; bifunctional organolanthanide (III); $Mo(CH-t-Bu)(NAr)(OCMe_3)_2$ and $Mo(CHCPhMe_2)(NAr)(OCMe(CF_3)_2)_2$; $HI/I_2$; Zr, Ti and Hf complexes combined with either methylaluminoxane or phenyl borates; diimide complexes of Pd, Ni, Fe or Co; homogeneous Ta, Ti, Mo, W carbene complexes; rare earth metal complexes composed of metallocene type or non-metallocene type complexes; cationic monocyclopentadienyl zirconium acetamidinate complexes; esterified fluorinated telomers with one or two hydroxyl group as initiators for copper mediated living polymerisation; $Yb[C(SiMe_3)_3]_2$.

Figure 2:
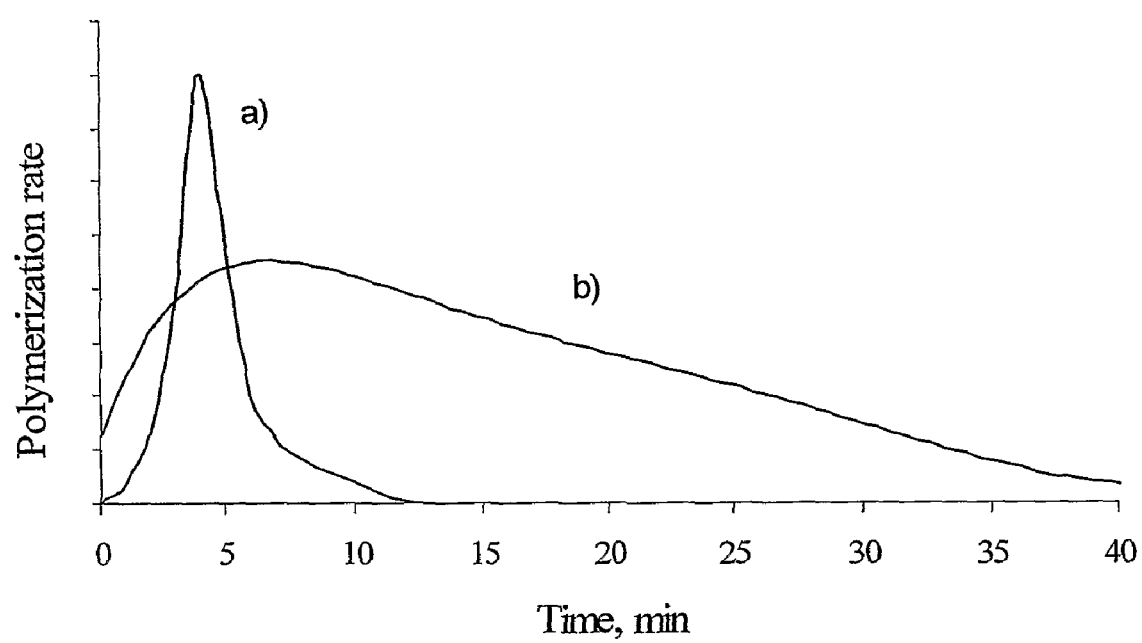
FIG. 2 shows polymerization rate profiles for bulk radical polymerization (a) and living polymerization (b).

One advantage of living polymerization in contrast to traditional radical polymerization is that the former proceeds with a low rate and with no observable autoacceleration, while latter frequently proceeds with a strong autoacceleration (see e.g., ref. 15). The typical polymerization rate profiles for free radical polymerization which proceeds through normal and living mechanisms are presented in FIG. 2. It is clear that it is much easier to control living polymerization than normal free radical polymerization in bulk. The present invention takes advantage of this by performing living polymerization in conditions which favour formation of polymers with relatively low-molecular weight. Typically the reaction is stopped at an early stage producing polymers with molecular weight 500-1000000 Da.

In one aspect, the present invention relates to the optimization of the conditions of the reaction in order to generate particles with relatively small size. An important part of the process is selection of an appropriate living initiator and optimization of the conditions of the polymerization reaction. A popular example of LRP involves nitroxide-mediated living free radical polymerization of olefins. Another example includes systems of CuCl/bpy and benzenesulfonyl chloride.

Living radical polymerisation initiators can be prepared from discrete organic molecules or from macromolecules. In reality, most compounds that contain a hydroxyl, carboxylic or amino groups can be converted into an initiator, and thus incorporated easily into the polymer. This can either be at the terminus of the polymer in the case of a mono-functional initiator, or in the middle of the polymer in the case of a multi-functional initiator.

The reaction conditions favouring formation of relatively low-molecular weight polymers include, but are not limited to: (i) using stoichiometric ratio between initiator and monomers; (ii) cooling the reaction or stopping UV or other irradiations, which will terminate the radical formation at early stage of the reaction; (iii) removal of the monomers from contact with the growing polymer chain e.g., by filtration or chromatography; (iv) adding inhibitors to the reaction; (v) performing polymerization in very dilute solution. The preferable option would be stopping irradiation. As a result of controlled living polymerization MIP particles can be formed with the size 500-1000000 Da which could exist in soluble or at least colloidal forms.

In one aspect, the present invention relates to monomers which can be used for MIP preparation, including: vinyl monomers, allyl monomers, acetylenes, acrylates, methacrylates, derivatives of amino acids, nucleosides, nucleotides, and carbohydrates.

Cross-linking monomers can also be used if it is necessary to fix or stabilize the structure of the resulting replica molecule, so that it remains complementary to that of the template. Typical examples of cross-linkers suitable for MIPs include ethylene glycol dimethacrylate, methylene bisacrylamide, and N,N'-bisacryloylpiperazine. Those skilled in the art could select monomers and cross-linkers suitable for a particular system. Alternatively a variety of combinatorial and computational methods could be used to assist in this selection.

In one aspect, the present invention relates to the separation of particles synthesized by living polymerization by chromatography, filtration and electrophoresis. The separation of the synthesized polymer can be achieved by affinity chromatography, when immobilized template is used for the purification of polymer fraction with the highest affinity to the template, by gel permeation chromatography which separates polymer fractions with different size. This is achieved by change in solution pH, in ionic strength, or through the addition of urea, guanidine, or substances which interact with the template more strongly than does the polymer, by filtration, electrophoresis, chromatographic separation, washing, centrifugation or dialysis.

The affinity chromatography is in particular a powerful tool, and is particularly preferred, because it allows preparation of MIPs with narrow distribution of affinities to the template. This is currently impossible to achieve with traditional MIPs.

It is also possible to perform living polymerization using an initiator which has a specific property, e.g., high or low hydrophobicity, which would allow the use of extraction (liquid or solid phase) to separate the MIP from the non-reacted monomers and the template.

Alternatively growing polymer chains can be modified with another polymer or functional group with the intention of introducing a specific property to the MIPs which would facilitate its extraction or other form of separation. An example of this again could be a polymer with a hydrophobic tail which would allow, e.g., extraction of the polymer from aqueous solution by organic solvent. It would be possible to introduce a specific binding group, e.g., biotin, which would allow selective removal of the polymer by affinity adsorbent. Those skilled in the art are familiar with the wealth of experimental protocols which allow this modification and corresponding separation.

In one aspect, the present invention relates to sequential polymerization when the imprinted polymer is modified with other types of molecules in order to change properties or functions of synthesized molecules. It has been mentioned already that the growing polymer chain can be modified with another polymer or functional group to facilitate its separation. One important property of living polymerization is the ability to stop a reaction and continue it later by simply stopping e.g., UV irradiation of the reaction mixture. The end of the growing polymer chain contains initiator which can be activated again to initiate a new round of polymerization. Thus the growing polymer chain could be exposed to another monomer and the polymerization continues resulting in the formation of block polymers. The new monomer could introduce a new functionality into the polymer. Thus in addition to the affinity to the first template, provided by the first MIP, an extended polymer could have affinity to the second template introduced into the system. The extended block polymer could have fluorescent tags attached to end groups which would be useful in diagnostics.

Other types of modification are also possible which would introduce other functionalities such as ability to generate active species with biocide properties, catalytic groups, isotope labels, groups useful for the immobilization, sensing etc. These functionalities could also be introduced into the polymer by using corresponding functionalized initiator.

In one aspect, the present invention relates to applications of the synthesized molecules as drugs in pharmacology and medicine, as receptor-specific ligands in analytical chemistry (sensors, assays), for separation in biotechnology, pharmacology and food industry. The soluble nature of synthesized polymers makes them ideal targets for use as drugs. The selective binding to the enzyme, receptor or other biological molecule could be used to affect biological functions of these molecules. Thus the MIPs synthesized by living polymerization could be used in vivo for modulation of biological processes. When bound with isotopes or fluorescent tags MIPs could be used as selective contrasting agents or in other forms of diagnostics. MIPs integrated with ligands capable of producing in certain conditions e.g., single molecular oxygen, could be used as selective biocide agents. A variety of other modifications could be proposed by those skilled in art to introduce antibiotic properties into MIPs prepared by living polymerization.

The synthesized MIPs could be used as a substitute to natural antibodies and receptors in different forms of assays and sensors. Several features make MIPs prepared by living polymerization particularly attractive objects for the application in sensors. Thus synthesized MIP molecules still contain initiator which can be used to covalently attach polymers to the solid surfaces. Thus simple UV irradiation might be sufficient to bind MIPs to surfaces covered with double bonds.

The ability to use affinity chromatography to separate MIP ligands into several fractions with different affinities could be advantageous for the preparation of sensors/assays with varying detection ranges. For some applications Blank polymers prepared by living polymerization in the absence of template could also be used. It would be necessary however to prepare such polymers using monomers which possess certain affinity or other properties necessary for this particular application. Those skilled in the art know how to select such monomers by using e.g. computational or combinatorial approaches. It is necessary to clarify that using both MIPs and Blank polymers prepared in a fashion as described in embodiments 1-6 is covered by the scope of present invention.

The present invention will now be further described particularly with references to the following non-limiting examples.

EXAMPLES

Example 1

Synthesis of MIP Particles with Affinity to 6-Methyl-1,3,5-triazine-2,4-diamine

A mixture of 1.17 g acetonitrile, 0.32 g methacrylic acid, 0.046 g 6-Methyl-1,3,5-triazine-2,4-diamine (template), 0.36 g trimethylolpropane trimethacrylate (TRIM), 0.36 g ethylene glycol dimethacrylate (EGDMA) and 0.087 g diethyldithiocarbamic acid benzyl ester (living initiator) was purged with nitrogen and polymerized under UV radiation (UVAPRINT 100 CVI UV source with 0.163 W/cm$^2$ intensity, Dr. Hönle) for 2.5 min in a closed glass bottle. The resulting soluble polymer molecules were separated by gel permeation chromatography (GPC) using ToyoPearl HW55S adsorbent packed into a Buchi B-685 230×15 mm column. A mixture of acetonitrile/water 90/10% was used as eluent, and supplied at a flow rate of 0.6 ml/min by HPLC pump (Hewlett Packard Series 1050). The column was loaded with the reaction mixture and fractions were collected every 5 min. Control (Blank) polymer was prepared the same way, but in the absence of template. The total weight of synthesized polymer was 0.034 g (yield ~3%). Approximately the same yield was achieved also for Blank polymer. The molecular weight of fractions were determined using Agilent 1100 series HPLC equipped with size exclusion column (Phenomenex BioSep S 2000) calibrated with Phenomenex medium molecular weight polystyrene standards (range 13-104 kDa). The mobile phase used was THF at a flow rate 0.7 ml/min. Injection volume was 40 µl. Absorbance was measured at 256 nm for polystyrene and 230 nm for MIP particles. The fractions of synthesized polymer had average molecular weight:
10-15 min fraction—90 kDa;
15-20 min fraction—67 kDa;
20-25 min fraction—13 kDa.

Example 2

Affinity Separation of Synthesized Polymer a) Preparation of Affinity Adsorbent-Immobilization of Template Analogue.

The polymer with immobilized template analogue was prepared by mixing 5 g DMF, 5 g EGDMA, 0.30 g 2,4-diamino-6-(methacryloyloxy)ethyl-1,3,5-triazine and 0.1 g 1,1'-Azobis(cyclohexanecarbonitrile). The 2,4-diamino-6-(methacryloyloxy)ethyl-1,3,5-triazine is a template analogue containing polymerizable double bonds. This mixture was purged with nitrogen and polymerized by UV (UVAPRINT 100 CVI UV source with 0.163 W/cm² intensity, Dr. Hönle) for 20 min. The resulting affinity polymer was ground and wet sieved in methanol. Particles with size 25-106 µm were collected and washed for 48 hours in a Soxhlet extractor with methanol and packed into a Buchi B-685 230×15 mm column.

b) Affinity Chromatography

The purified fractions of synthesized MIP were loaded on affinity column prepared as describe in Example 2a) and eluted with acetonitrile at a flow rate of 2 ml/min supplied by HPLC pump (Hewlett-Packard Series 1050). After 10 min the eluent was changed to solution of 0.05% acetic acid in acetonitrile to elute the high affinity polymer. The MIP polymer was purified from the acetic acid and any residual template by additional separation by GPC as described in Example 1. Both MIP and Blank polymers were treated in the same way.

Example 3

Immobilization of Synthesized MIP and Blank Polymers onto Solid Phase a) Preparation of Solid Phase (Trim Polymer) for Immobilization.

A mixture of 5 g TRIM, 5 g acetonitrile and 0.1 g 1,1'-azobis(cyclohexanecarbonitrile) was purged with nitrogen and polymerized under UV (UVAPRINT 100 CVI UV source with 0.163 W/cm² intensity, Dr. Hönle) for 2.5 min to allow for a large number of non-reacted double bonds. The resulting polymer was then ground and wet sieved in methanol. Particles with size 25-106 µm were collected and washed in a Soxhlet extractor by methanol for 24 hours. The large amount of available double bonds (~36%) remained in the polymer as confirmed by FTIR analysis.

b) Immobilization of MIP and Blank Polymers onto the TRIM Polymer 4 ml of acetonitrile/water solution (90/10%) containing 71 µg of MIP particles with size of fraction 90 kDa were added to 180 mg of TRIM polymer prepared as described above in a 10 ml glass bottle. The solution was degassed with nitrogen for one minute and placed under UV for 8 min. HPLC analysis of the liquid phase performed after the UV exposure demonstrated that 88.8% of the MIP particles were immobilized giving density of immobilized polymer 0.35 mg/g TRIM. The resulting polymer was then placed in 1 ml Phenomenex SPE tube and washed with 5 volumes of acetonitrile with 1% acetic acid and 20 volumes of acetonitrile and dried at 80° C. for 30 minutes. The procedure was repeated with non-imprinted particles.

Example 4

Affinity Tests 70 mg of TRIM polymer with immobilized MIP and Blanks particles was placed in 2 ml HPLC vials. 1 ml template solution with concentration ranging from 1 to 125 ng/ml was added to the polymer and incubated for 12 hours. The template concentration in solution after incubation was analysed by HPLC-MS. The results from the binding experiments for MIP and Blank polymer were used to calculate the dissociation constants by a Double Reciprocal Plot. According to the calculation MIP possessed dissociation constant and the concentration of binding sites respectively $7.7\times10^{-8}$ M and $0.97\times10^{-6}$ moles/g. For Blank polymer the dissociation constant was determined $1.9\times10^{-5}$ M and the concentration of binding sites $1.5\times10^{-5}$ moles/g.

These results clearly prove that the synthesized MIP possessed substantially higher affinity than Blank (~250 times).

Example 5

Selectivity Test 70 mg of TRIM polymer with immobilized MIP and Blanks particles was placed in 2 ml HPLC vials. 1 ml analyte solution with concentration 40 ng/ml was added to the polymer and incubated for 12 hours. The analyte concentration in solution after incubation was analysed by HPLC-MS. The analytes tested included 6-Methyl-1,3,5-triazine-2,4-diamine (template), and its analogues: atrazine, metribuzine and simazine. The amount of each compound adsorbed by the polymer is depicted in Table 1, in nmol/g polymer.

TABLE 1

Adsorption of the analytes by MIP and Blank polymers and their cross-reactivity expressed as a percentage of binding compared with this of the template.

|  | Template | Atrazine | Metribuzine | Simazine |
|---|---|---|---|---|
| MIP |  |  |  |  |
| Binding, nmol/g | 1.62 | 0.12 | 0.11 | 0.07 |
| Cross-reactivity (%) | 100 | 7.4 | 6.8 | 4.3 |
| Blank |  |  |  |  |
| Binding, nmol/g | 0.41 | 0.35 | 0.21 | 0.18 |
| Cross-reactivity (%) | 100 | 85 | 51 | 44 |

The results clearly show that the imprinted polymer possesses much higher selectivity to the target template as compared to its structural analogues.

Example 6

Dependence of the Yield of the Polymer on the Irradiation Time

Polymerization mixture was prepared as described in section Example 1 in the absence of template. The aliquots of monomer mixture were collected after 0, 20, 60, 90, 150 and 170 s of UV irradiation, diluted 200 times in THF and analyzed by GPC as described in Example 1. The results in Table 2 described the yield of predominant fraction (3-100 kDa).

TABLE 2

The dependence of yield of the polymer on different irradiation time.

| Polymerization time, s | Polymer concentration, mg/ml |
|---|---|
| 0 | 0 |
| 20 | 0 |
| 60 | 0.13 |
| 90 | 0.37 |
| 150 | 0.38 |
| 170 | 0.46 |

The invention claimed is:

1. A process for the preparation of a solution or colloidal suspension of a polymer comprising (i) a synthesis step comprising template-directed living polymerisation of functional monomers in a polymerisation system including a molecular template, thereby producing a complementary polymer at least a part of which is complementary to at least a part of the template, and the step including terminating the living polymerisation before gelling, to produce complementary polymer particles which are soluble or able to exist in colloidal suspension; and (ii) a separation step which comprises providing a chromatography medium having an immobilised template, and performing affinity chromatography with it on the product of the synthesis step to isolate a complementary polymer fraction having a specific affinity to the template.

2. A process according to claim 1, in which the process includes a step of modifying the complementary polymer particles to produce derived polymer particles, at least a part of which is complementary to at least a part of the template, for preparation of the solution or colloidal suspension.

3. A process according to claim 1, wherein the living polymerisation technique is selected from iniferter polymerisation, stable free radical mediated polymerisation, atom transfer radical polymerisation (ATRP), and reversible addition-fragmentation chain transfer (RAFT) polymerisation.

4. A process according to claim 3, wherein the living polymerisation technique is a nitroxide mediated radical polymerisation.

5. A process according to claim 3, wherein the living polymerisation technique is an iniferter polymerisation and the iniferter is selected from:
   photo iniferters bearing a dithiocarbamyl group; and
   thermal iniferters bearing an azo group.

6. A process according to claim 1, wherein the living polymerisation is initiated by an initiator selected from:
   2-bromopropionitrile with Cu(I)Br complexed with N,N,N',N'',N'' pentamethyldiethylenetriamine;
   polystyrene bromo macroinitiator with Cu(I)Cl/PMDETA;
   ethyl 2-bromoisobutyrate with CuCl/bipyridine;
   1,4-bis(2,6-diisopropylphenyl)acenaphatenediiminen-ickel (II) dibromide;
   2,2-dimethoxy-2-phenylacephenone in combination with tetraethylthiuram disulfide;
   tetraphenyl biphosphine;
   tertiary peroxides (e.g., di-tert-butyl peroxide);
   $SmMe(C_5Me_5)_2(THF)$;
   styrene-based epoxides in conjunction with $TiCl_4$;
   methylstyrene tetramer disodium;
   $MoOCl_4$-n-BuSn-EtOH;
   $HCl/ZnCl_2$;
   methyl p-toluenesulphonate;
   2,10,15,20-tetraphenylporphinato aluminium methyl;
   3-methyl-1,1-diphenylpentyllithium;
   butyllithium in THF;
   molybdenum alkylidine compounds;
   bifunctional organolanthanide(III);
   $Mo(CH-t-Bu)(NAr)(OCMe_3)_2$;
   $Mo(CHCPhMe_2)(NAr)(OCMe(CF_3)_2)_2$;
   $HI/I_2$;
   Zr, Ti and Hf complexes combined with either methylaluminoxane or phenyl borates;
   diimide complexes of Pd, Ni, Fe or Co;
   homogeneous Ta, Ti, Mo, W carbene complexes;
   rare earth metal complexes composed of metallocene type or non-metallocene type complexes;
   cationic monocyclopentadienyl zirconium acetamidinate complexes;
   esterified fluorinated telomers with one or two hydroxyl groups; and
   $Yb[C(SiMe_3)_3]_2$.

7. A process according to claim 1, wherein the complementary polymer has a molecular weight of 500-1,000,000 Da.

8. A process according to claim 1, in which the process includes the steps of: separating from the polymerisation system a complex comprising the template and complementary polymer; and subsequent removal of the template.

9. A process according to claim 8, wherein removal of the template involves separation of the template from the polymer by means of one or more of change in pH of the solution, change in the ionic strength of the solution, and adding urea, guanidine, or a substance which interacts with the template stronger than does the polymer.

10. A process according to claim 8, wherein the removal of the template employs one or more of filtration, electrophoresis, chromatographic separation, washing, centrifugation, and dialysis.

11. A process according to claim 1, in which the process further comprises the use of affinity separation to isolate a complementary polymer fraction having a specific affinity to the template.

12. A process according to claim 1, wherein the living polymerisation is performed under one or more of the following conditions:
   i) a stoichiometric ratio between initiator and monomers;
   ii) initiating polymerisation by heating, and terminating by cooling the polymerisation system;
   (iii) initiating polymerisation by irradiation, and terminating by stopping irradiation;
   (iv) removal of monomers from contact with the growing complementary polymer;
   (v) addition of inhibitors to the polymerisation system; and
   (vi) the polymerisation system employs a dilute reaction solution.

13. A process according to claim 1, wherein the functional monomers are selected from:
   vinyl monomers;
   allyl monomers;
   acetylenes;
   acrylates;
   methacrylates;

derivatives of amino acids;
nucleosides;
nucleotides; and
carbohydrates.

14. A process according to claim 1, wherein the living polymerisation includes the steps of:
   a) template-directed living polymerisation of a functional monomer in the presence of a template;
   b) stopping polymerisation;
   c) re-starting polymerisation in the presence of a different functional monomer; thereby producing a complementary polymer which is a block copolymer, at least a part of which is complementary to at least a part of the template; and
   d) optionally repeating steps a) to c).

15. A process according to claim 1, further comprising the step of cross-linking the functional monomers.

16. A process according to claim 15, wherein the cross-linking is effected by one or more cross linkers selected from:
   ethylene glycol dimethacrylate;
   methylene bisacrylamide; and
   N,N'-bisacryloylpiperazine.

17. A process according to claim 1 including a further step of contacting the solution or colloidal suspension of a polymer with a surface; and restarting the living polymerisation to effect reaction between the polymer and the surface.

18. A process according to claim 1 further comprising isolating said solution or colloidal suspension of a polymer and using said solution or colloidal suspension of a polymer as a receptor-specific ligand.

19. A process according to claim 1 further comprising isolating said solution or colloidal suspension of a polymer and using said solution or colloidal suspension of a polymer as a separation matrix.

20. A process according to claim 1 further comprising isolating said solution or colloidal suspension of a polymer and using said solution or colloidal suspension of a polymer as a contrasting agent, catalyst or sensor element.

21. A process according to claim 1 including a further step of attaching an isotope or a fluorescent tag to the polymer.

* * * * *